Patented Nov. 16, 1943

2,334,499

UNITED STATES PATENT OFFICE 2,334,499

PRESERVING LIME

Harry E. Millard, Annville, Pa.

No Drawing. Application November 30, 1938,
Serial No. 243,203

3 Claims. (Cl. 106—119)

The invention relates to preserving chemicals and, more particularly, to preserving lime compounds to prevent deterioration during shipment and storage.

There are two common types of lime known by the general name of "lime." One is calcium oxide also known as caustic or quick lime, and the other is calcium hydroxide also known as hydrated or slaked lime. Quick lime is ordinarily produced by calcining calcium carbonate ($CaCO_3$), occurring as limestone, marble, calcite, shells of mollusks, etc., at temperatures in excess of 1000° F. During burning, carbon dioxide is driven off as gas and there is a considerable reduction in weight (56# lime-44# $CO_2$) but there is practically no decrease in volume. Because of its friability and high porosity, quick lime is particularly susceptible to exposure in atmospheric conditions and is, therefore, a highly perishable commodity. Quick lime exposed to the air is rapidly attacked by two elements always present—water vapor and carbon dioxide. The water vapor reacts with the calcium oxide to form calcium hydroxide and the carbon dioxide reacts with the calcium oxide to form calcium carbonate. Commercial hydrated lime is slaked or hydrated lime with just the proper quantity of water to yield a fine dry powder.

According to the invention, the lime, in some cases caustic or quick lime, in other cases hydrated or slaked lime, and in still other cases any mixture of the two, is subjected to a vacuum treatment to remove air and free moisture, and compressed into cakes. This makes a denser product of reduced porosity, making the product less perishable. If desirable, certain binding agents may be used to help hold the cake together and, in addition, coating agents may be used to insure the exclusion of air and moisture from the pressed mass. It is desirable that the binding and coating agents should be selected to have a beneficial, or at least non-detrimental, effects on the processes with which the cakes are to be used. The cake may be any size convenient for shipping and storage and for use in the particular industry. For example, the cakes may be of the size of relatively small tablets or of larger briquets, or, in some cases, the cakes may be quite large. For example, the briquets may be in the form of cylinders 2½ inches in diameter and 2 inches high.

The invention also consists in certain new and original features of operation in the process and combinations and proportions of materials hereinafter set forth and claimed.

The invention will first be described as applied to caustic or quick lime. The quick lime is ground or pulverized to an extremely fine comminuted state. Or, the quick lime may be taken direct from the kiln without special pulverization. Here, it is desirable that the particle size be less than ⅛ inch and the lime should have the proper particle gradation, including at least 20 per cent of material capable of passing through a 100 mesh sieve. The percentages given here and hereinafter are by weight.

In case a binding agent is desired, an agent will be selected which will be beneficial to, or at least not interfere with, the particular chemical industry to which this particular lime is to be used. For example, for use in open hearth and blast furnaces for the manufacture of iron and steel, either starch or asphalt, or a mixture of both, may be used as a binding agent. A suitable form for starch may be pulverized tapioca produced in the Dutch East Indies. The asphalt may be of such composition and character that, when heated up to, say, between 500° and 600° F., it is extremely liquid. These materials may be added in various percentages necessary to give the proper bonding and hardness and to provide proper air and moisture excluding properties. The starch provides mainly hardness. The percentage of asphalt and starch may each run anywhere up to about 5 per cent, for example. The pulverized starch and hot liquid asphalt may be thoroughly mixed with the caustic lime to form a homogeneous mixture. Care must be taken not to add an excessive amount of asphalt or the cakes will stick to the molds during the subsequent compressing and molding operation.

The mixture of caustic lime and binding material is then subjected to vacuum treatment and compressed into cakes, briquets or tablets according to the demand of the industry. A given mix or batch may be vacuum treated all at the same time. The deaerated and dried material may be compressed into cakes, tablets or briquets in any machine commonly used for this purpose. Or, the mix may be first placed in a press and the vacuum treatment then given to each cake, briquet or tablet separately. The molds of the press may be perforated to permit expulsion of the air from the lime mass as it is being compressed and subjected to the vacuum treatment. Heat may also be applied during the vacuum or pressing process, or during both.

In some cases, either of the binding agents, or both, may be omitted, the natural cohesion between the finely divided particles compacted under pressure being relied upon to hold the cakes together and to give them hardness.

It has been found that a range of 1000 to 10,000 pounds pressure per square inch is sufficient to compress the material into the cakes of the desired density. It is desired that the amount of vacuum be approximately 20 to 30 inches of mercury to insure the removal of all the air and vapor which has filled the voids of the compressed mix. The vacuum treatment and compressing operation may be carried on at a temperature of 100 to 300° F.

After forming the material into cakes, they are immediately treated with a suitable coating before moisture or carbon dioxide from the surrounding air has a chance to attack them. This coating preferably takes place within a few minutes after the compressing and vacuum treatments. Any coating which is non-aqueous and moisture-proof may be used, but it is preferable to use coatings which will be beneficial to, or at least will not interfere with, the particular chemical process with which the lime product is to be used.

Petroleum byproducts, such as wax or paraffin, are suitable coatings and will not interfere with most processes with which the lime is to be used. Other coatings, for example, are asphalt, dextrin, calcium stearate, soap, etc. Calcium stearate, for example, makes a good coating for building lime. Asphalt, for example, makes a good coating for lime to be used in open hearth and blast furnaces for steel manufacture.

The coatings may be applied either by immersing the cakes in a bath of the coating, or by spraying the coating, or in any other desired way. The coatings may be applied hot, in which case, they become hard at room temperature or the coatings may be applied cold, the solvent evaporating and leaving a layer of coating material on the cakes. In the case of certain asphalts, the finished cakes may be submersed with the asphalt temperature bordering on the flash point. This results in a briquet or cake having a wall of asphalt which is impervious to the elements. The temperature of the asphalt bath may be approximately 200° F. The temperature of the bath and the length of time the cakes are immersed govern the thickness of the jacket. The jacket may account for up to 10 per cent of the total weight of the briquet.

The process may be carried out with standard apparatus. For example, any press commonly used for compressing finely divided material into cakes, tablets or briquets, hot or cold, may be used. Any desirable vacuum generating apparatus may be used, such as for example, a high vacuum pump.

The above process has been described as applied to caustic or quick lime, which is calcium oxide. If desired, the process may also be applied to hydrated or slaked lime, which is calcium hydroxide. In this case, the water of crystallization ordinarily forming part of the lime, which in the case of commercial hydrated lime may be around 23 per cent, acts as a binder without requiring any special binding agent.

However, any of the above-mentioned binders may be used in addition to the water. For example, about 5 per cent of starch, in the form of tapioca, may be added to give mechanical strength, but the water of crystallization and the finely divided state of the commercial hydrated lime offers all of the cohesion required to make a strong cake. Due to the extreme particle fineness of commercial hydrated lime, 90 per cent of which ordinarily passes through a 300 mesh sieve, no vacuum treatment is necessary in most cases. In the absence of caustic lime, the presence of air seems to have no serious effects.

The invention is also applicable to mixtures of caustic and hydrated lime. These materials may be mixed together in the desired proportions prior to the vacuum treatment and compressing operation, and the process, above described, applied. No special binding agent or any of the binding agents above mentioned may be used. Any of the above coating agents may also be used, depending upon the requirements of the use to which the lime is to be put.

Thus a process has been described which produces a lime product of high density and low porosity. Its particles are effectively bonded together and its coating insures the exclusion of air and moisture for a long time. The division of the raw material into extremely fine particles plus the high pressures used produces a cake, briquet or tablet with high cohesion between the particles even without a special binder.

By practicing the invention, it can be assured that the lime upon reaching the consignee will have the same guaranteed analysis as it had when it left the manufacturer. The process obviates the necessity for special storage and shipping facilities, which are now required to prevent deterioration of lime compounds. The manufacture of lime products into cakes of predetermined shape and size insures greater uniformity since the voids between the individual cakes can be definitely calculated as contrasted with the conventional raw product which may be of fine homogeneous consistency some times and lumpy other times.

The uniformity of size inherent in the tablets, briquets or cakes is of use particularly in furnaces, such as blast furnaces where the lime forms part of the charge through which draft passes. Not only is the exact ratio of solid to void known for measurement by volume, but the impedance to the draft caused by the cakes can also be depended upon. This is in direct contrast to present practice in which the lime is introduced into the blast furnace in pebble or lump form with rather wide variations in size and consequently interferes with or retards the passage of the gases or the draft through the charge.

The purpose of complete air removal from the interior of the cake in the case of caustic lime is obviously to prevent attack from within because such attack means temperature rise, causing the air present to expand, which in turn causes splitting open of the cake and the immediate exposure of the broad area of the element for wholesale disintegration.

The presence of the starch imparts hardness and mechanical strength, these qualities being desirable to enable the cakes to withstand the various handling operations incidental to the manufacture, shipping and storing of the cakes themselves and in the particular industries in which the cakes are used, this handling including mechanical elevators, conveyors, chutes, unloading equipment, etc.

The lime products according to the invention may be used in very much the same industries as the conventional lime products are now used. For example, in addition to use in blast furnaces and open hearth furnaces for the production of steel, the lime products according to the invention may be used in the following industries:

paper, paint, mortar and cement, chemical, dyes, food, hides, etc., and also in agriculture.

While certain novel features of the invention have been disclosed and are pointed out in the annexed claims, it will be understood that various omissions, substitutions and changes may be made by those skilled in the art without departing from the spirit of the invention.

What is claimed is:

1. A briquet comprising essentially lime, as a preserved commodity, said briquet comprising finely divided lime mixed with a binding agent, said briquet being compressed to form a hard cohesive mass and a moistureproof and airtight coating entirely enclosing said briquet.

2. A briquet comprising essentially caustic lime, as a preserved commodity, said briquet comprising finely divided caustic lime mixed with finely divided starch as a binding agent, said briquet being compressed and deaerated to form a hard cohesive mass and having a substantially watertight and airtight petroleum coating, all of said caustic lime having a particle size of less than one-eighth of an inch and at least 20% of said caustic lime having a particle size corresponding to a 100 mesh screen, said binding agent being present in substantial amounts up to 5% of the total weight of the briquet, said coating being present in substantial amounts up to 10% of the total weight of the briquet, the remainder of the briquet being substantially all caustic lime.

3. A cake comprising essentially caustic lime, as a preserved commodity, said cake comprising finely divided caustic lime mixed with a binding agent, said cake being compressed to form a hard cohesive mass and having a substantially watertight and airtight coating, all of said caustic lime having a particle size of less than one-eighth of an inch and at least 20% of said caustic lime having a particle size corresponding to a 100 mesh screen, said binding agent being present in substantial amounts up to 5% of the total weight of the cake, said coating being present in substantial amounts up to 10% of the total weight of the cake, the remainder of the cake being substantially all caustic lime.

HARRY E. MILLARD.